United States Patent Office

Re. 26,182
Reissued Apr. 4, 1967

26,182
METHOD OF PREPARING AN EDIBLE MEAT PRODUCT

David Torr, Oyster Bay, N.Y., assignor to Ralston Purina Company, St. Louis, Mo.

No Drawing. Original No. 3,173,795, dated Mar. 16, 1965, Ser. No. 372,704, June 4, 1964. Application for reissue Oct. 8, 1965, Ser. No. 496,250
10 Claims. (Cl. 99—108)

Matter enclosed in heavy brackets [ ] appears in the original patent but forms no part of this reissue specification; matter printed in italics indicates the additions made by reissue.

This invention relates generally to food products and more particularly to a novel and useful poultry product comprised primarily of poultry meat and comminuted poultry skin and/or poultry meat. said product, when formed, being thermosetting of character, and to a method of preparing such product. The invention similarly relates to the preparation of packing house animal products utilizing the method described hereinbelow with respect to poultry animal products.

The present application is a continuation in part of co-pending applications Serial No. 308,655, filed September 13, 1963, and Serial No. 328,122, filed December 4, 1963, entitled Poultry Product and Method of Preparation, and Method of Treating Animal By-Product and Meat Product Prepared Therewith, respectively, said co-pending applications now abandoned.

The use of the muscle meats of chicken and turkey as food is, of course, well-known, and their uses include cooked products such as creamed chicken and turkey, chicken a la king, chicken and turkey pies, chicken croquettes, chicken salads, sandwiches and in many other ways. In recent years, frozen chicken and turkey pies have made their appearance, along with other products based on the use of chicken meat such as chicken sticks, chicken patties, etc. Within the past few years, a number of turkey rolls have been placed on the market. In the case of the turkey roll, cooked or uncooked pieces of turkey meat have been placed in a casing under pressure, in some instances gelatin has been added as a binder, and these casings stuffed with turkey meat are frozen and are marketed in frozen form. In addition, these presently marketed turkey rolls, because of the fact that only the muscle meats of the birds have been utilized, have resulted in a product calculated to demand very high wholesale and retail prices to thereby keep the product in the luxury class insofar as meats are concerned.

The invention is generally directed toward the effective utilization of poultry skin and/or certain poultry meats otherwise discharded as undesirable parts of the bird, in the production of an all-poultry food product essentially free of adulterants or non-poultry fillers or binders. The product of the invention is in the form of a pre-cooked roll, loaf or the like, which retains its integrity when served cold, at room temperature, or when heated for serving, so that it can be sliced without disintegrating, crumbling or falling apart. Thus, it is capable of being used efficiently for cold cuts, sandwiches, salads, etc., to the end of effectively competing with the above-noted heretofore known poultry product preparations.

Consonant with the foregoing, a general object of the invention is to provide a method for producing a turkey or chicken product, in roll or other forms heretofore known, in such a manner so as to place on the market a chicken or turkey product which is economical to produce, thus enabling the removal of such products from the luxury class to further afford a product which will compete favorably with such products as liverwurst, bologna, boiled ham, etc.

A more specific object of the present invention resides in the provision of a method of forming an all or substantially all-poultry food product wherein poultry skin comminuted to fibriform consistency is utilized as a matrix to bind and incorporate large or small pieces of meat in a composite form.

Another object of the instant invention is to provide a method whereby the gelatine formed by hydrolysis of the collagen of the skin and other like materials are economically removed from the product during production thereof.

A further object of the invention is to provide a filler matrix of the character described which may consist entirely of non-emulsified comminuted fibrous row poultry skin or the latter homogeneously combined with comminuted fibrous dark meat taken from the leg of the poultry.

Another object of the present invention resides in the provision of an all-poultry product which is composed entirely of uncooked ingredients prior to being stuffed into a casing.

Still another object of the instant invention resides in the formation of a food product composed of a binder matrix prepared substantially of comminuted poultry or packing house animal meat of fibriform consistency admixed with any suitable pieces of meat, as e.g., chicken, turkey, ham, tongue and the like either singly or in combination.

The above objects together with others which will be apparent from the following description may be attained by carrying out the improved process in the manner hereinafter described in detail.

With reference now to the present preferred embodiment of the invention, it will be appreciated that the poultry may be obtained in eviscerated form, already cut up into parts, i.e., legs, thighs, breasts, etc., removal or not of the skin being optional. The meat is then boned out to obtain the largest pieces practicable. Ideally, it will be understood, the bird yields six pieces of boneless meat; one piece each for the leg and thigh portions and two pieces for the breast portion. The bones are then discarded and the meat set aside for subsequent use.

Raw poultry skin, normally considered a by-product in the usual processing of birds for human consumption, is readily and economically obtainable and is utilized herein, in conjunction with the present process, for preparation of the binder matrix of the ultimately formed product.

The treatment of the raw skin resides in the reduction thereof to comminuted fibriform consistency, the desirable magnitude of individual fibers being approximately ⅛" by .020" of diameter. To so convert the skin to particulate fibrous form, a standard cutter, preferably of the rotating bowl type having rotating cutter blades disposed normally to the base of the bowl is employed. Accordingly, the raw skin is placed in the cutter at a temperature of approximately 68° F., salt added, and as comminution commences, ice is gradually introduced to the batch until a temperature of about 59° F. is attained, at which temperature the batch is maintained until the desired fibrous condition is achieved. Based upon the quantity of product in the cutter, the duration of time required to effectuate this phase may range from between five minutes to one hour.

I have discovered that the sought-after binding character of the fibriformed skin is enhanced by the addition of uncooked dark meat of the leg or thigh during the comminuting step. The proportion of dark meat to skin is not critical and may be five percent of dark meat to the weight of skin or the amount of dark meat may even surpass the weight of skin. It will be appreciated that the dark meat so used, and especially that of older birds, is usually considered undesirable for other uses and hence its incorporation herein with the raw skin for use as a binder matrix affords a profitable use for a product would otherwise remain an economic waste. Poultry meat alone, it will be appreciated, may be comminuted, to serve as the binder matrix.

Upon finalization of the comminuting step as hereinabove described, the fibriformed batch, consisting either of raw skin in its entirety, of raw skin and dark meat in fibrous homogeneous form, or as comminuted dark meat alone, is removed from the cutter and admixed with the pieces of boneless meat which had heretofore been set aside, salt or other suitable seasoning being added as the admixture is prepared.

*It will therefore be appreciated that the thus far described process comprised of comminuting raw poultry parts to fibriform consistency to form a fibrous product, cooling the parts during the comminution thereof, and interspersing pieces of raw poultry meat substantially uniformly with the fibrous product, accomplishes the preparation of intermediate phase product which is important to the production of the useful completed food product.*

Thus, the product at this phase will be understood to consist of the raw comminuted binder matrix, raw pieces of meat being interspersed substantially uniformly therewith. Large or small amounts of meat may be utilized depending, of course, upon the type of market being sought. That is, where luxury market distribution and consumption is to be involved, the ratio of fibrous matrix to meat may be 1:4, while a converse ratio may be employed for the economy market. Intermediate ratios, of course, will be suitable for markets lying between the aforesaid extreme classes.

The uncooked mixture is now hand- or pressure-stuffed into a flexible natural or synthetic casing, one end of which has been closed with cord or a metal clip. The casing is preferably provided with a plurality of apertures interspersed throughout the surface area thereof, the purpose of said apertures to be described hereinbelow. The stuffed casing is next placed into a metal form or cage wherein a pressure of approximately 60 p.s.i. will be exerted upon the casing to thus mold the product into the desired shape or form, i.e., loaf or roll, and to render a tightly packed product to thus facilitate slicing, handling, etc., thereof. Where a metal mold is utilized, apertures are provided through the surface thereof, said apertures being preferably in registry with the aforementioned casing apertures.

The product, now encased in the flexible casing and pressure form, is cooked in water to an internal temperature of about 170° F., and depending upon the diameter and size of the roll or loaf, the cooking period may range from 30 minutes to approximately 6 hours. Cooking may, if desired, be accomplished in a dry oven or a smoking oven. It will be further appreciated that the encased product alone, absent, the pressure form may be cooked to obtain a desirable end food product.

I have found, however, that upon cooking the encased product, the resulting product when cooled, produces a layer of gelatine on the outer surface thereof between the product and the casing. The prevalence of the gelatine in addition to being wasteful, further renders the product difficult to handle inasmuch as slicing must be effectuated at temperatures of approximately 30 to 35° F., whereafter the sliced product, upon reaching room temperature becomes difficult and unpleasant to handle. Accordingly, whereas removal of the gelatine during the cooking step is a significant desideratum, I have found that the provision of apertures, as above described, through the casing and pressure mold, engenders the release and drainage of the gelatine to thereby readily and conveniently obviate the unpleasantness and problems otherwise present.

Subsequently to cooking, the encased product, either while still within the mold or after removal therefrom, is cooled to a temperature between 50–70° F., and preferably 60° F., a cooling water spray, ice immersion, a holding cooler or any other suitable means being utilized for such purpose. Upon cooling, the fibrous matrix provides excellent binding for the pieces of meat interspersed throughout, permitting this finished combined product to be sliced easily at normal temperatures, refrigeration being not required to preserve the integrity of the roll or loaf for slicing and the slices remain firm and solid in use. It will further be appreciated that the instant finished product will remain firm even upon heating, and unlike the product disclosed in United States Letters Patent No. 3,024,113, granted to me March 6, 1962, which is thermoplastic in nature, displays a thermosetting property. This thermosetting attribute is believed due to the cold status of the skin and/or meat while being comminuted to form the fibriform matrix material and also because the matrix material is formed of uncooked ingredients.

Packing house animal products and packing house by-products as well as poultry animal products may also be treated in accordance with the invention, said products including all edible animal products and by-products of an organic, noncalcareous nature, as distinguished from bones and the like which consist largely of inorganic matter. The invention also contemplates the treatment of organic, noncalcareous, packing house animal by-products generally classified as inedible but which may be converted to edible materials by the process disclosed and taught herein.

More particularly, the term edible packing house animal products and organic packing house by-products, as used herein, and in the appended claims, will be understood not to include bones, hair, wool, or the like, but to respectively include all of the fleshy or meaty portions of the animal and by-products, e.g., ears, lips, snouts, the meaty portion of the head, knuckles, feet, tails, tendons, brain, muscular tissues, sinews, fats, glands, skin tissues, cheeks, tongue, cartilage, horn piths, pizzles, stomach, lungs, intestines and viscera generally.

Accordingly, by utilizing the process as aforedescribed with respect to poultry animal products, otherwise inedible animal by-products are converted to an edible and useful form, economy of finished product being the primary end purpose. It will be appreciated that fleshy or meaty animal components may similarly be reduced to fibriform consistency in accordance with the foregoing and to provide an effective binder matrix, its usefulness as a filler material, however, being absent in view of the great expense of such high quality meat. The preparation of a matrix consisting of choice animal products coupled with by-products is, of course, contemplated herein, the inclusion of fibriformed meat with fibriformed by-products having occasionally been found to enhance the binding character of the homogeneous matrix.

As above stated with respect to poultry animal meat, the greatest economy of product will obviously be attained where the binder filler matrix consists entirely of treated animal by-products. Large or small amounts of meat pieces may be dispersed or admixed with the matrix depending upon the type of market being sought. That is, where luxury market distribution and consumption is the desideratum, the ratio of fibrous matrix to whole pieces of meat may be 1:4, while a converse ratio may be employed for the economy market. Intermediate proportions may, of course, be suitable for markets lying therebetween. Thus, the invention, it will be appreciated, is applicable not only to poultry and the other usual food animals, but also to horses, deer, rabbits and any other animals suitable for food for human consumption, or for pet, poultry or packing house animal feeding.

The finished product, whether comprised of poultry or packing house animal products, may now be marketed in any conventionally known manner, i.e., by placement in a freezer and marketed frozen; by placement in a can and sealed to be sold as a refrigerated product or the encased product itself may be stored in a refrigerator at between 30 and 40° F., and similarly marketed as a refrigerated product; or the encased product may be placed in a can and marketed as a product requiring no refrigeration. As is well-known, to be marketed as a canned product requiring no refrigeration, sterilization at 240° F. for the required time is necessary, whereas pasteurization at 165° F., is required where the product is to marketed as a refrigerated product.

Inasmuch as changes may be made in carrying out the above method and product, without departing from the scope of the invention, it is intended that all matter contained in the above description shall be interpreted as illustrative and exemplary and not in a limiting sense. Accordingly, such variations falling within the purview of this invention may be made while within the spirit of the invention and without sacrificing any of the attendant advantages thereof, provided, however, that such changes fall within the scope of the claims appended hereto.

What I claim is:

1. The method of preparing a food product comprising the steps of comminuting raw poultry skin to fibriform consistency to form a fibrous binder matrix, cooling the poultry skin during the comminution thereof, mixing pieces of meat with said matrix, packing the mixture in a casing, cooking the encased mixture, and cooling the encased mixture to form a product which retains its integrity at normal and cooking temperatures and which is capable of being sliced into integral slices at normal and heated temperatures.

2. The method of preparing an edible poultry product comprising the steps of comminuting raw poultry parts selected from the group consisting of poultry skin, poultry meat and mixtures of the foregoing to fibriform consistency to form a fibrous binder matrix, cooling the poultry parts during the communition thereof, mixing pieces of poultry meat with said matrix, packing the mixture in an apertured casing, placing the encased mixture into an apertured pressure mold form, cooking the encased mixture while in the mold, draining any gelatine formed by hydrolysis of collagen during cooking, and cooling the encased mixture to form a thermosetting product which is capable of being sliced into integral slices at normal and cooked temperatures.

3. The method of preparing a food product comprising the steps of comminuting raw poultry parts selected from the group consisting of poultry skin, poultry meat and mixtures of the foregoing to fibriform consistency to form a fibrous product, cooling the poultry skin during the comminution thereof, mixing pieces of poultry meat with the fibrous product, packing the product in a casing, cooking the encased product, and cooling the encased product to form an end product which retains its integrity at normal and cooking temperatures and which is capable of being sliced into integral slices at normal and heated temperatures.

4. The method of preparing a food product comprising the steps of reducing raw animal by-products to fibriform consistency to form a fibrous binder matrix, cooling the raw animal by-products during the reduction thereof, mixing pieces of meat with sad matrix, packing the mixture in a casing, cooking the encased mixture, and cooling the encased mixture to form a product which retains its integrity at normal and cooked temperatures and which is capable of being sliced into integral slices at normal and heated temperatures.

5. The method of preparing a food product comprising the steps of reducing raw animal parts selected from the group consisting of animal by-products, animal meats and mixtures of the foregoing to fibriform consistency to form a fibrous product, cooling the raw animal parts during the reduction thereof, mixing pieces of meat with said fibrous product, packing the product in a casing, cooking the encased product, and cooling the encased product to form an end product which retains its integrity at normal and cooking temperatures and which is capable of being sliced into integral slices at normal and heated temperatures.

6. The method of preparing an edible meat product comprising the steps of reducing raw animal parts selected from the group consisting of animal by-products, animal meats and mixtures of the foregoing to fibriform consistency to form a fibrous binder matrix, cooling the animal parts during the reduction thereof, mixing pieces of meat with said matrix, packing the mixture in an apertured casing, placing the encased mixture into an apertured pressure mold form, cooking the encased mixture while in the mold, draining any liquid matter exuded during cooking, and cooling the encased mixture to form a thermosetting product which is capable of being sliced into integral slices at normal and cooked temperatures.

*7. The method of preparing a food product comprisings the steps of comminuting raw poultry parts selected from the group consisting of poultry skin, poultry meat and mixtures of the foregoing to fibriform consistency to form a fibrous binder matrix, cooling the poultry parts during the comminution thereof and mixing pieces of raw meat with said matrix to form a coherent product which when cooked, thereafter retains its integrity at normal and cooked temperatures and which is capable of being sliced into integral slices at normal and heated temperatures.*

*8. The method of preparing a food product comprising the steps of reducing raw animal by-products of fibriform consistency to form a fibrous binder matrix, cooling the raw animal by-products during reduction thereof, and mixing pieces of raw meat with said matrix to form a coherent product which when cooked, thereafter retains its integrity at normal and cooked temperatures and which is capable of being sliced into integral slices at normal and heated temperatures.*

*9. The method of preparing an edible meat product comprising the steps of reducing raw animal parts selected from the group consisting of animal by-products, animal meats and mixtures of the foregoing to fibriform consistency to form a fibrous binder matrix, cooling the animal parts during the reduction thereof and mixing pieces of raw meat with said matrix to form a coherent product which when cooked, thereafter retains its integrity at normal and cooked temperatures and which is capable of being sliced into integral slices at normal and heated temperatures.*

*10. The method of preparing a food product comprising the steps of comminuting raw poultry skin to fibriform consistency to form a fibrous binder matrix, cooling the poultry skin during the comminution thereof, and mixing pieces of raw meat with said matrix to form a product which when cooked, thereafter retains its integrity at normal and cooked temperatures and which is capable of being sliced into integral slices at normal and heated temperatures.*

References Cited by the Examiner

The following references, cited by the Examiner, are of record in the patented file of this patent or the original patent.

UNITED STATES PATENTS

| | | | |
|---|---|---|---|
| 2,622,028 | 12/1952 | Torr | 99—107 |
| 2,622,029 | 12/1952 | Torr | 99—107 |
| 2,640,779 | 6/1953 | George | 99—107 |
| 2,876,100 | 3/1959 | Rogers et al. | 99—107 X |
| 3,024,113 | 3/1962 | Torr | 99—107 |

A. LOUIS MONACELL, *Primary Examiner.*

HYMAN LORD, *Examiner.*